US009027758B2

(12) United States Patent
Lee et al.

(10) Patent No.: US 9,027,758 B2
(45) Date of Patent: May 12, 2015

(54) COLLAPSIBLE SIFTER

(71) Applicant: Robinson Home Products Inc., Williamsville, NY (US)

(72) Inventors: Stuart Harvey Lee, Forest Hills, NY (US); Jenna Marie Edgemon, Brooklyn, NY (US)

(73) Assignee: Robinson Home Products Inc., Williamsville, NY (US)

( * ) Notice: Subject to any disclaimer, the term of this patent is extended or adjusted under 35 U.S.C. 154(b) by 0 days.

(21) Appl. No.: 14/188,322

(22) Filed: Feb. 24, 2014

(65) Prior Publication Data

US 2014/0246360 A1    Sep. 4, 2014

Related U.S. Application Data

(60) Provisional application No. 61/771,678, filed on Mar. 1, 2013.

(51) Int. Cl.
*B03B 9/04* (2006.01)
*A47J 43/22* (2006.01)

(52) U.S. Cl.
CPC ........................................ *A47J 43/22* (2013.01)

(58) Field of Classification Search
USPC ................... 209/233, 236, 417; 210/232, 740
See application file for complete search history.

(56) References Cited

U.S. PATENT DOCUMENTS

| 2,063,499 | A |   | 12/1936 | Hall |
| 2,391,215 | A | * | 12/1945 | Zabel et al. ................... 210/495 |
| 4,271,011 | A | * | 6/1981 | Spencer et al. ............... 209/236 |
| 4,534,858 | A | * | 8/1985 | Aldrich et al. ................ 209/236 |
| 5,494,200 | A |   | 2/1996 | Sheffler et al. |
| D526,541 | S |   | 8/2006 | Repp et al. |
| D558,538 | S |   | 1/2008 | Curtin |
| D558,539 | S |   | 1/2008 | Curtin |
| D581,747 | S |   | 12/2008 | Repp et al. |
| D588,947 | S |   | 3/2009 | Curtin |
| 7,678,271 | B2 | * | 3/2010 | Curtin ........................... 210/232 |
| D652,746 | S |   | 1/2012 | Lee et al. |
| D660,661 | S |   | 5/2012 | Lee et al. |
| D661,955 | S | * | 6/2012 | Lee et al. ....................... D7/667 |
| D665,233 | S |   | 8/2012 | Shamoon |
| 2006/0096929 | A1 | * | 5/2006 | Repp et al. .................... 210/740 |
| 2009/0065509 | A1 | * | 3/2009 | Schuler ....................... 220/573.1 |
| 2010/0170840 | A1 |   | 7/2010 | Curtin |

* cited by examiner

*Primary Examiner* — Terrell Matthews
(74) *Attorney, Agent, or Firm* — Florek & Endres PLLC

(57) ABSTRACT

A collapsible sifter having a substantially rigid annular top rim, a substantially rigid annular bottom ring, a flexible annular middle portion having two or more living hinges to collapse the sifter from an open configuration to a collapsed configuration and a removably attachable bottom implement. First and second cooperating elements, associated with the annular bottom ring and the bottom implement, are used to removably attach the bottom implement to the bottom annular ring.

11 Claims, 6 Drawing Sheets

COLLAPSIBLE SIFTER

FIELD OF THE INVENTION

The present invention relates to a sifter, such as the type commonly used for cooking or baking, which is collapsible for efficient storage.

BACKGROUND OF THE INVENTION

Kitchen items, such as sifters, are often bulky and difficult to store because they take up significant cabinet, drawer or shelf space relative to their size. Moreover, sifters are useful in a variety of applications requiring screen meshes of various mesh sizes.

Although the prior art describes sifters or shakers where the screen members can be changed, including, U.S. Pat. Nos. 2,063,499, 4,534,858 and 5,494,200, the structures are not described as facilitating storage and do not call for the use of different screens.

Generally, however, one must purchase and store multiple sifters to cover the range of mesh sizes commonly used for cooking and baking.

Accordingly, a need exists for a single sifter capable of accommodating user determinable screen meshes of various mesh sizes as well as a sifter which is also adaptable to thereby significantly reduce the amount of required storage space.

SUMMARY OF THE INVENTION

The present invention is directed generally to a collapsible sifter comprising a substantially rigid annular top rim and a substantially rigid annular bottom ring wherein the top rim and the bottom ring are joined by a flexible annular middle portion having at least one living hinge and wherein the bottom ring comprises one component of a set of cooperating members for the removable attachment of a bottom implement.

The living hinge in the middle portion allows the sifter to be collapsed for convenient storage. In a preferred embodiment of the present invention, the middle portion comprises two living hinges so that the sifter can be collapsed into three substantially concentric sections to reduce the vertical height of the collapsible sifter.

The collapsible sifter of the present invention also comprises a bottom implement for removable attachment to the bottom ring. The bottom ring of the collapsible sifter comprises one component of a set of cooperating members for the removable attachment of a bottom implement, thereby allowing the user to remove the bottom implement and replace it with a different bottom implement. The ease with which the bottom implement can be removed also allows for easier cleaning of the collapsible sifter as well as the bottom implement itself.

In a preferred embodiment of the present invention, the bottom implement is a screen useful for sifting ingredients such as flour during cooking or baking. However, since the bottom implement is removably attached to the bottom ring, other functionality can be provided by the bottom implement, i.e., different mesh sizes, a funnel, etc.

The collapsible sifter of the present invention may also comprise a stabilizing member which prevents the sifter from tipping over and spilling its contents when placed on a flat surface. The stabilizing member can be one or more legs, one or more stands, one or more weights, an external stand or an external holding dish.

The top rim of the collapsible sifter also preferably comprises a handle making it easier to hold, transport or manipulate the sifter. In addition, a tab may optionally be placed on the top rim opposite the handle to allow the collapsible sifter to be supported on the rim of another vessel placed below the sifter or to be supported with two hands while the sifter is being used.

BRIEF DESCRIPTION OF THE DRAWINGS

The present invention will be better understood when considered in view of the attached drawings, in which like reference characters indicate like parts. The drawings, however, are presented merely to illustrate the preferred embodiment of the invention without limiting the invention in any manner whatsoever.

DETAILED DESCRIPTION OF THE PREFERRED EMBODIMENT

Figure 1:
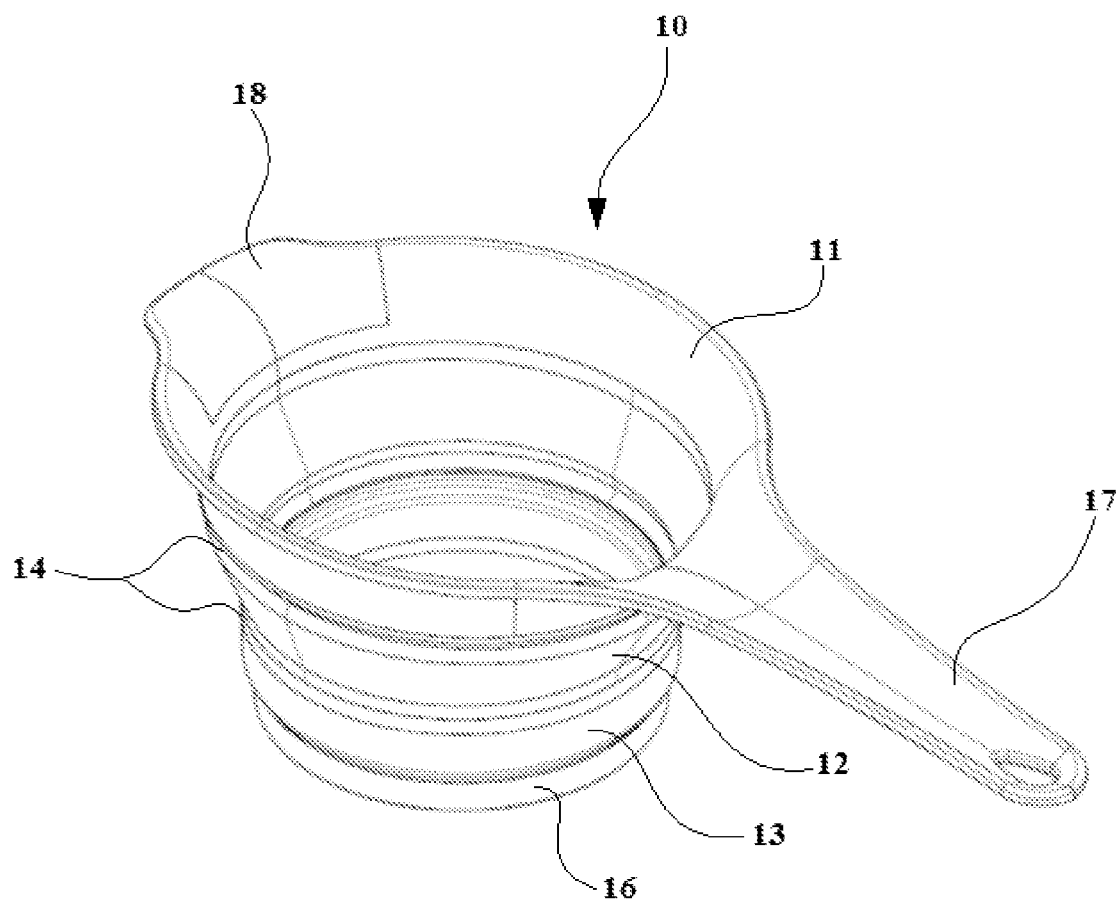
FIG. 1 is a perspective view of an embodiment of the collapsible sifter of the present invention.
Figure 2:
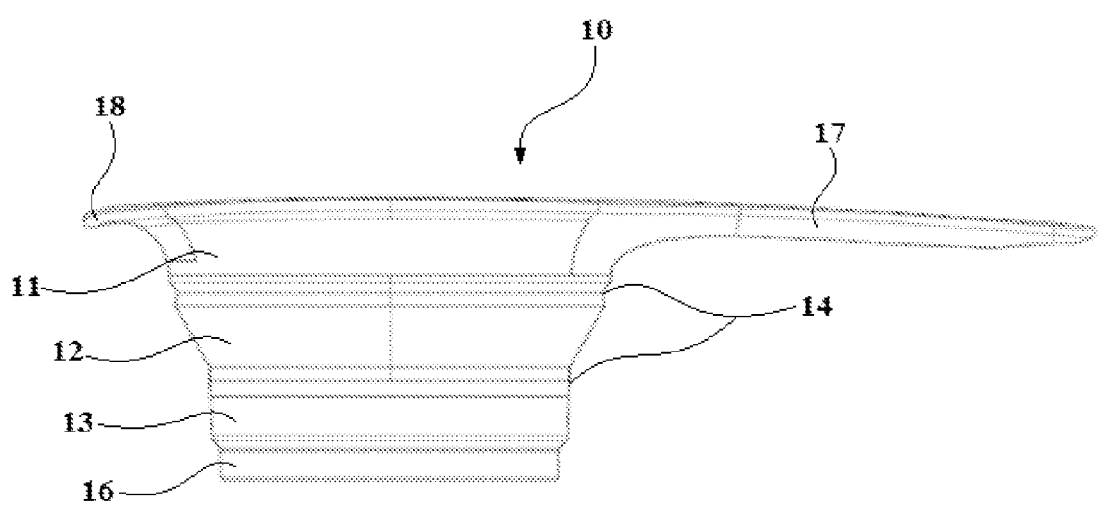
FIG. 2 is a side view of an embodiment of the collapsible sifter of the present invention.
Figure 3:
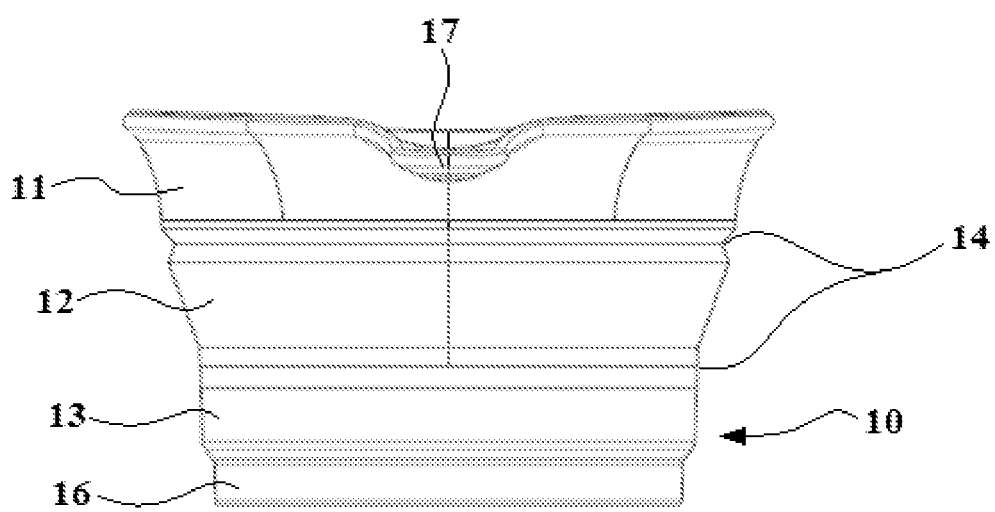
FIG. 3 is a side view of an embodiment of the collapsible sifter of the present invention.
Figure 4:
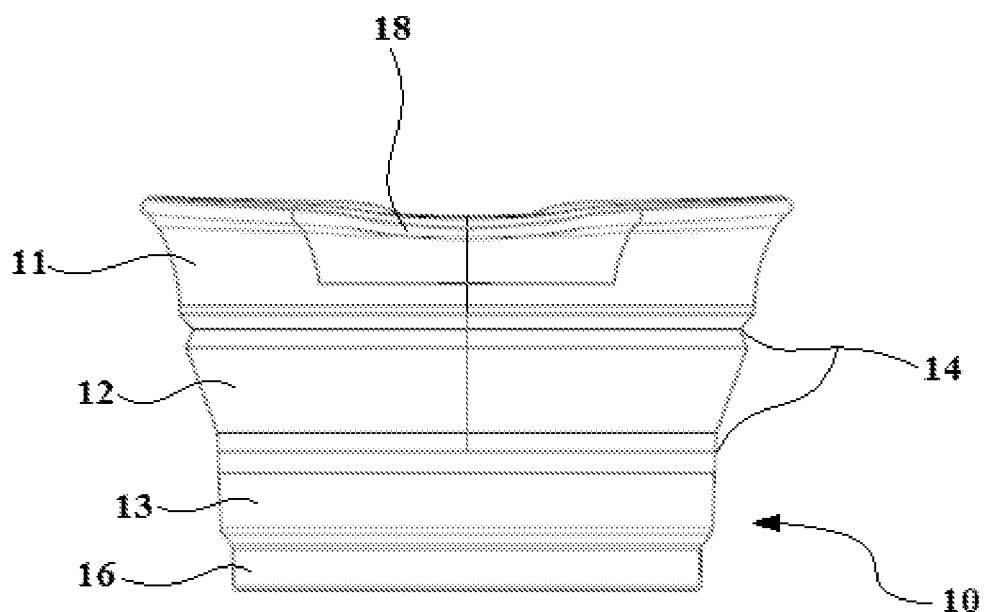
FIG. 4 is a side view of an embodiment of the collapsible sifter of the present invention.
Figure 5:
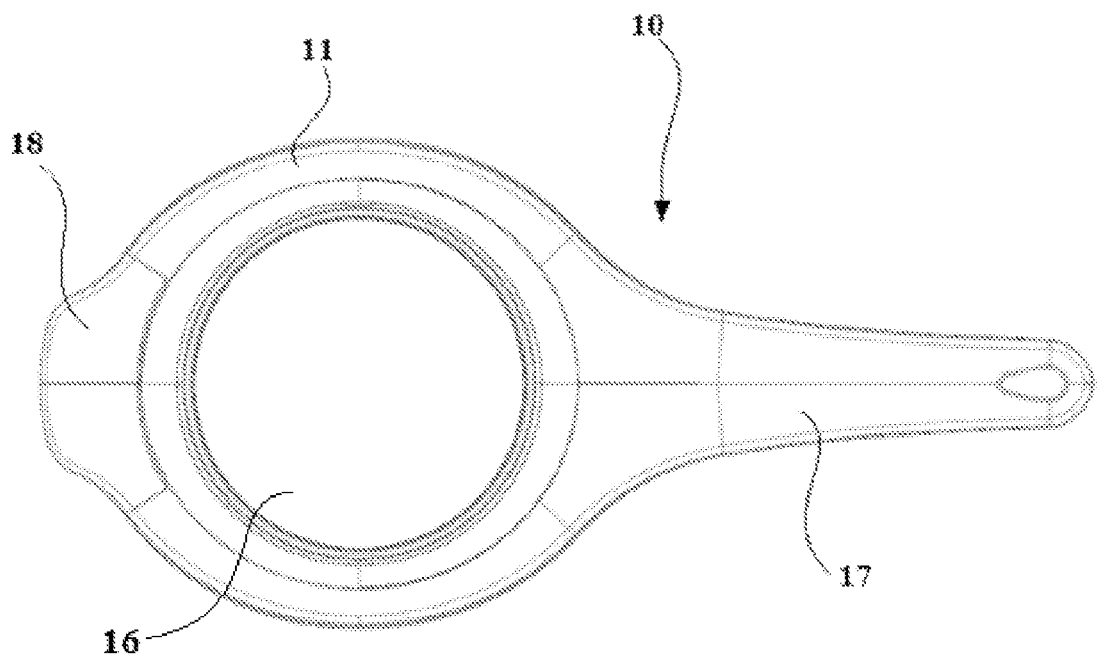
FIG. 5 is a top view of an embodiment of the collapsible sifter of the present invention.

In a preferred embodiment, shown in accompanying FIGS. 1-6, the collapsible sifter 10 is formed of a substantially rigid annular top rim 11 and a substantially rigid annular bottom ring 13 wherein the top rim 11 and the bottom ring 13 are joined by a flexible annular middle portion 12 having at least one living hinge 14.

Figure 6:
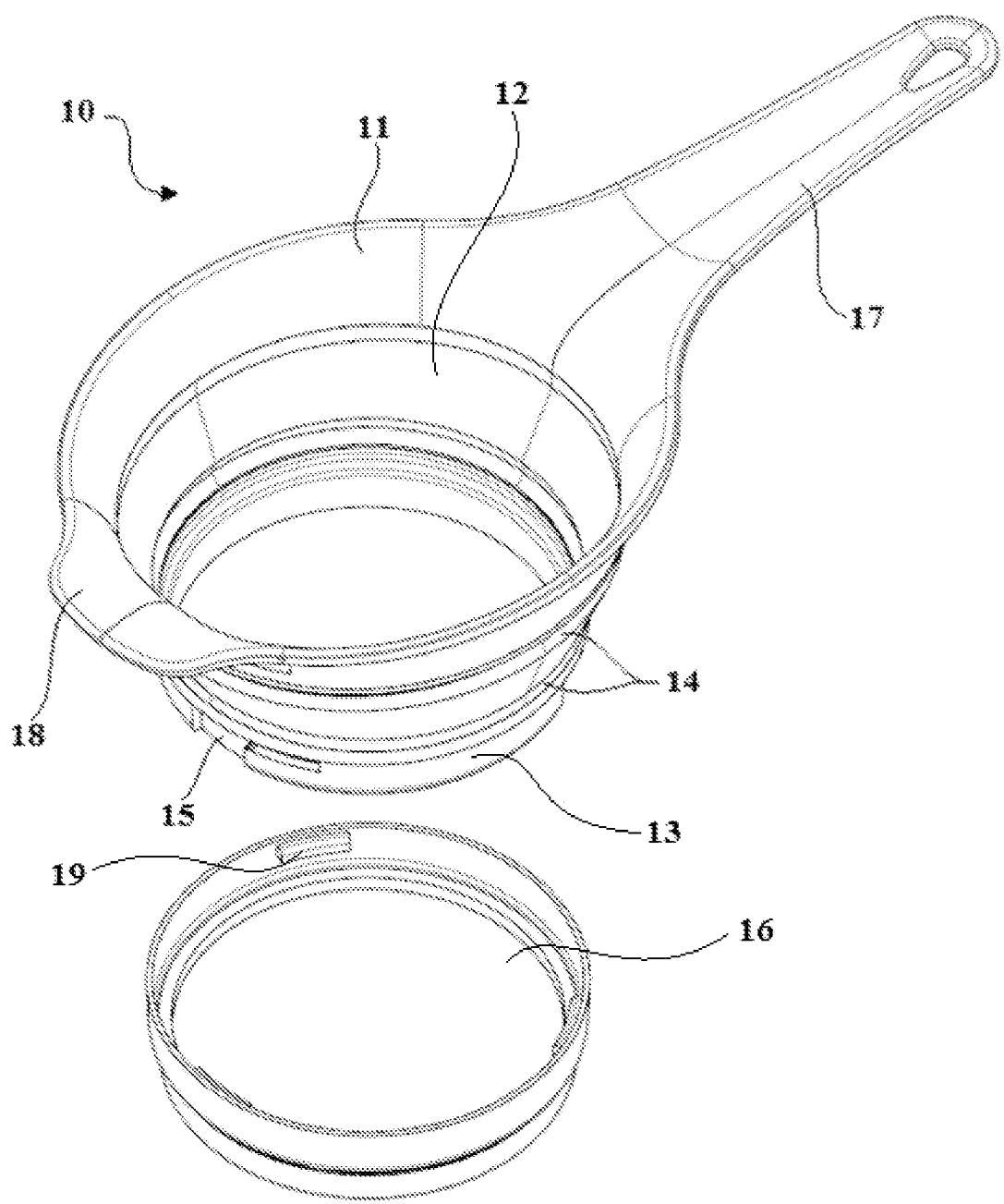
FIG. 6 is an exploded perspective view of an embodiment of the collapsible sifter of the present invention.

The present invention also comprises a bottom implement 16 that is removably attached to the bottom ring 13. The bottom ring 13 and the bottom implement 16 each include one component of a set of cooperating members 15, 19 for removable attachment of the bottom implement 16 on the bottom ring 13. As seen in FIG. 6, the first component of the cooperating members 15 is found on the bottom ring 13 with the second component of the cooperating members 19 found on the bottom implement 16.

Although the cooperating members 15, 19 are shown in FIG. 6 as bayonet locks, it is preferred that bayonet locks, screw threads, clamps, clips, snaps, magnets, clasps or frictional contact are created by sizing the opening of the bottom ring 13 slightly smaller or equal to the opening of the bottom implement 16. When a frictional fit is used, it preferably includes a deformable material affixed to one of the bottom ring 13 or bottom implement 16 that compresses between the bottom ring 13 and the bottom implement 16 so as to enhance frictional fit. Of course, any suitable cooperating elements may be used to removably attach the bottom implement 16 to the bottom ring 13.

The middle portion 12 of the collapsible sifter 10 may be formed of any suitable flexible material which is safe for use with food preparation, such as a thermoplastic elastomeric material. A most preferred material for the middle portion 12 is a silicone based thermoplastic elastomeric material. The top rim 11 and bottom ring 13 of the collapsible sifter 10 may be composed of any suitable substantially rigid material which is safe for use with food preparation, such as glass, stainless steel, aluminum and/or plastic. A preferred material for the top rim 11 and bottom ring 13 is plastic, and preferably an acrylonitrile butadiene styrene (ABS).

The top rim 11, bottom ring 13 and middle portion 12 each have an upper edge and a lower edge. The dimensions of the top rim 11, middle portion 12 and bottom ring 13 may be of respectfully reduced size so that when joined together the resultant collapsible sifter 10 in its open configuration preferably resembles a frustum of an inverted cone.

The upper edge of the middle portion 12 is affixed to the lower edge of the top rim 11 and the lower edge of the middle portion 12 is affixed to the upper edge of the bottom ring 13 by any suitable means known in the art, including, but not limited to, molding or adhering the top rim 11, bottom ring 13 and middle portion 12 to one another. Alternatively, the top rim 11 and bottom ring 13 may comprise tabs which are received by corresponding slots in the middle portion 12 or vice versa.

The use of at least one living hinge 14 allows the collapsible sifter 10 to be collapsed for storage by applying inward force simultaneously to the top rim 11 and bottom ring 13 or by applying downward force to the top rim 11 while the collapsible sifter 10 is sitting on a flat surface. Once in a collapsed configuration, the collapsible sifter 10 can be expanded to its useful or open configuration by applying outward force simultaneously to the top rim 11 and bottom ring 13.

In a preferred embodiment of the present invention, the middle portion 12 of the collapsible sifter 10 comprises two living hinges 14, which enable the collapsible sifter 10 to be collapsed into three substantially concentric sections.

The top rim 11, bottom ring 13 and middle portion 12 each have an outer circumference and an inner circumference. In a preferred embodiment of the present invention, the collapsible sifter 10 comprises a handle 17 which is attached to or unitarily formed with the top rim 11 or the bottom ring 13. The collapsible sifter 10 may also comprise an outwardly extending tab 18 placed on the outer circumference of the top rim 11 and opposite the handle 17. The tab 18 allows the collapsible sifter 10 to be supported using two hands and/or provides an area from which any contents of the collapsible sifter 10 can be poured.

In a preferred embodiment of the present invention, the bottom implement 16 comprises a screen. In embodiments where the bottom implement 16 is a screen, it is also contemplated that multiple screens of varying mesh size can be interchanged depending on the task being carried out. For example, a fine mesh screen may be used if the collapsible sifter 10 is being used to sift flour. In additional embodiments of the present invention, the bottom implement 16 may have large bores for performing tasks such as crushing tomatoes or a funnel for filling a container.

In a further embodiment of the present invention, the collapsible sifter 10 may additionally comprise a stabilizing member (not shown) which enables the collapsible sifter 10 to be placed on a flat surface without tipping and spilling its contents. The stabilizing member can be one or more legs, one or more stands, one or more weights, an external stand or an external holding dish.

Variations, modifications and alterations to the above detailed description will be apparent to those skilled in the art. All such variations, modifications and/or alternatives are intended to fall within the scope of the present invention, limited only by the claims. All cited patents and publications are hereby incorporated by reference.

We claim:

1. A collapsible sifter formed of a substantially rigid annular top rim, a substantially rigid annular bottom ring, a flexible annular middle having two or more living hinges to collapse the sifter from an open configuration to a collapsed configuration and a removably attachable bottom implement, further comprising a first cooperating element associated with the annular bottom ring and a second cooperating element associated with the bottom implement to removably attach the bottom implement to the bottom annular ring, and wherein the bottom implement is taken from the group consisting of a screen, a fine mesh screen, a coarse screen, and a funnel.

2. The collapsible sifter of claim 1 wherein the cooperating elements are taken from the group consisting of one or more bayonet locks, screw threads, clamps, clips, snaps, magnets, clasps, frictional contact and combinations thereof.

3. The collapsible sifter of claim 1 wherein the bottom implement comprises a screen.

4. The collapsible sifter of claim 1 wherein the top annular rim further comprises a handle.

5. The collapsible sifter of claim 4 wherein the top annular rim further comprises a tab opposite the handle.

6. The collapsible sifter of claim 1 further comprising a stabilizing member for preventing the sifter from tipping over and spilling its contents when placed on a flat surface.

7. The collapsible sifter of claim 5 wherein the stabilizing member is taken from the group consisting of one or more legs, one or more stands, one or more weights, an external stand, an external holding dish and combinations thereof.

8. The collapsible sifter of claim 1 wherein the flexible annular middle is made of a thermoplastic elastomeric material.

9. The collapsible sifter of claim 1 wherein the thermoplastic elastomeric material is a silicone based thermoplastic elastomeric material.

10. The collapsible sifter of claim 1 wherein the annular top rim and annular bottom ring are formed of a plastic material.

11. The collapsible sifter of claim 10 wherein the plastic material is an acrylonitrile butadiene styrene plastic.

\* \* \* \* \*